US012647379B2

(12) United States Patent
Sebastian et al.

(10) Patent No.: US 12,647,379 B2
(45) Date of Patent: Jun. 2, 2026

(54) SYSTEMS AND METHODS FOR LLM-ASSISTED EMAIL AUTOMATION

(71) Applicant: YAHOO ASSETS LLC, New York, NY (US)

(72) Inventors: Kenneth Sebastian, New York, NY (US); Carol Wang, New York, NY (US); Gregory Antonovsky, New York, NY (US); Renganathan Dhanagopal, New York, NY (US); Suraj Upreti, Toronto (CA); Edward Yang, New York, NY (US); Sanika Shirwadkar, New York, NY (US); Chinmay Rane, New York, NY (US); Praveen Mareedu, New York, NY (US); Lippe Oosterhof, New York, NY (US); Kaivalya Niranjan Gandhi, San Francisco, CA (US); Maria Piva, New York, NY (US)

(73) Assignee: YAHOO ASSETS LLC, New York, NY (US)

( * ) Notice: Subject to any disclaimer, the term of this patent is extended or adjusted under 35 U.S.C. 154(b) by 0 days.

(21) Appl. No.: 18/497,055

(22) Filed: Oct. 30, 2023

(65) Prior Publication Data

US 2025/0071074 A1 Feb. 27, 2025

Related U.S. Application Data

(60) Provisional application No. 63/578,929, filed on Aug. 25, 2023.

(51) Int. Cl.
*H04L 51/063* (2022.01)
*G06F 40/205* (2020.01)
(Continued)

(52) U.S. Cl.
CPC .......... *H04L 51/063* (2013.01); *G06F 40/205* (2020.01); *G06Q 10/107* (2013.01);
(Continued)

(58) Field of Classification Search
None
See application file for complete search history.

(56) References Cited

U.S. PATENT DOCUMENTS 9,965,791 B1 * 5/2018 Baxter .................. G06Q 30/08
10,789,566 B1 * 9/2020 Masterman .......... G06Q 10/083
(Continued)

*Primary Examiner* — John A Follansbee
*Assistant Examiner* — Christopher P Cadorna
(74) *Attorney, Agent, or Firm* — James J. DeCarlo; Greenberg Traurig, LLP

(57) ABSTRACT

In some implementations, the techniques described herein relate to a method including: (i) identifying, by a processor, an electronic message addressed to an inbox of a user that comprises a confirmation of a transaction involving a platform, (ii) searching, by the processor, for an additional electronic message addressed to the inbox indicating an alteration applicable to the transaction, (iii) causing display, by the processor, of a prompt informing the user of the alteration applicable to the transaction, (iv) composing, by a large language model (LLM) executed by the processor, a potential electronic message to an operator of the platform requesting the alteration be retroactively applied to the transaction, and (v) in response to receiving user input regarding the potential electronic message, sending, by the processor, a subsequent electronic message to the operator of the platform requesting the alteration be retroactively applied to the transaction.

13 Claims, 8 Drawing Sheets

(51) Int. Cl.

| | | |
|---|---|---|
| *G06Q 10/107* | (2023.01) | |
| *G06Q 30/0207* | (2023.01) | |
| *G06Q 30/06* | (2023.01) | |
| *H04L 51/21* | (2022.01) | |

(52) U.S. Cl.
   CPC ......... *G06Q 30/0207* (2013.01); *G06Q 30/06* (2013.01); *H04L 51/21* (2022.05)

(56)                References Cited

U.S. PATENT DOCUMENTS

| 11,962,546 B1 * | 4/2024 | Hattangady .......... | G06Q 10/107 |
|---|---|---|---|
| 2017/0178113 A1 * | 6/2017 | Mugford .............. | G06Q 20/102 |

\* cited by examiner

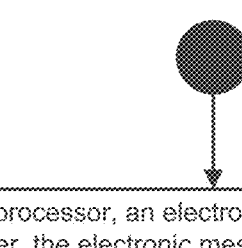

Identify, by a processor, an electronic message addressed to an inbox of a user, the electronic message comprising information related to a confirmation of a transaction involving a platform
202

Search, by the processor, for an additional electronic message associated with the inbox, the additional electronic message comprising functionality for altering a value associated with the transaction
204

Cause display, by the processor, of a prompt within a UI associated with the inbox, the prompt comprising information indicating the functionality for altering the value of the transaction
206

Compose, by an LLM executed by the processor, a draft electronic message to an operator of the platform, the draft electronic message comprising information requesting performance of the functionality for altering the value of the transaction
208

Communicate, by the processor over a network, in response to input related to the draft electronic message, a compiled version of the draft electronic message to the operator, the communication enabling the performance of the functionality for altering the value of the transaction
210

FIG. 2

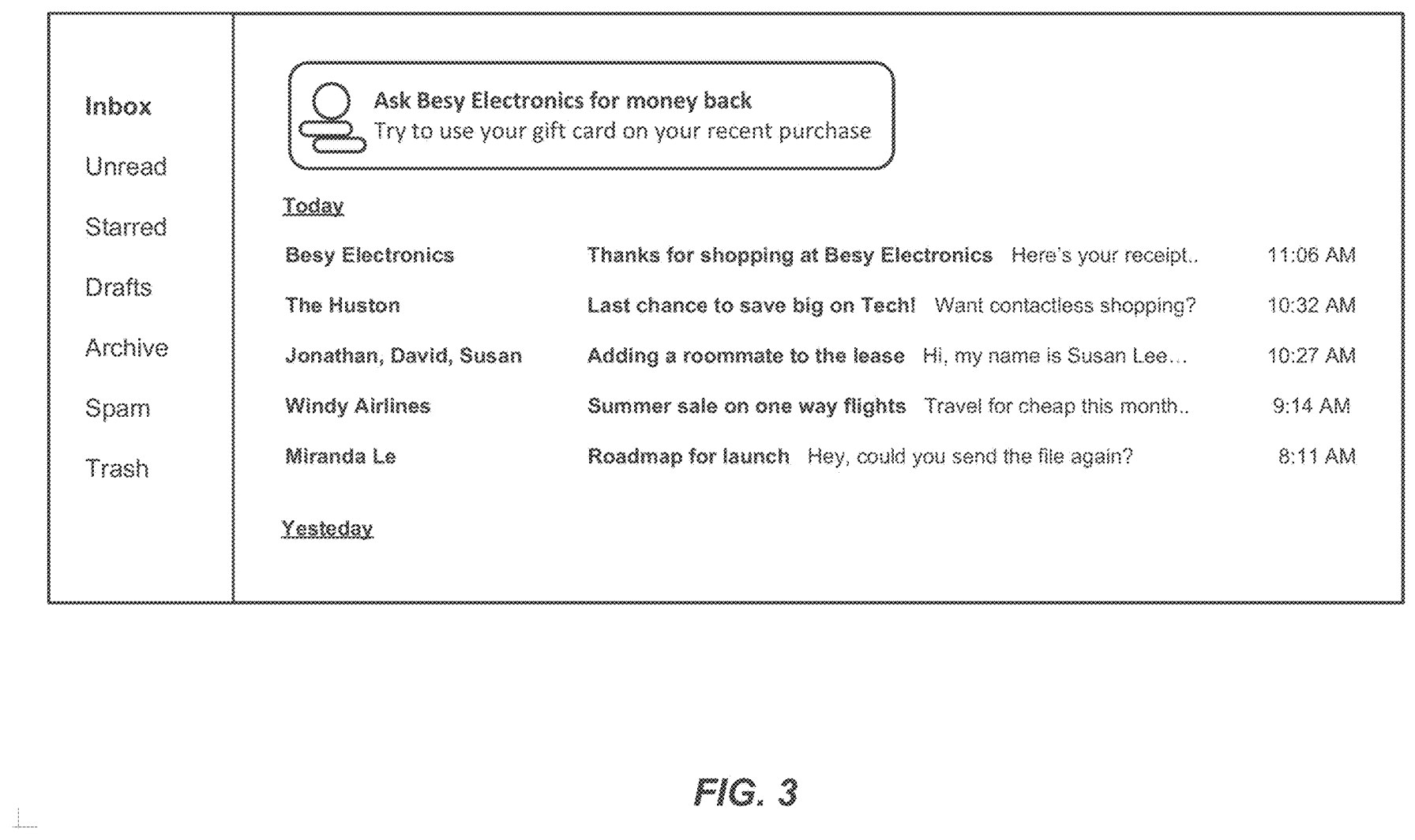

Inbox

Unread

Starred

Drafts

Archive

Spam

Trash

Ask Besy Electronics for money back
Try to use your gift card on your recent purchase Today Besy Electronics          Thanks for shopping at Besy Electronics   Here's your receipt..      11:06 AM The Huston               Last chance to save big on Tech!   Want contactless shopping?      10:32 AM Jonathan, David, Susan   Adding a roommate to the lease   Hi, my name is Susan Lee...      10:27 AM Windy Airlines           Summer sale on one way flights   Travel for cheap this month..      9:14 AM Miranda Le               Roadmap for launch   Hey, could you send the file again?      8:11 AM Yesterday

FIG. 3

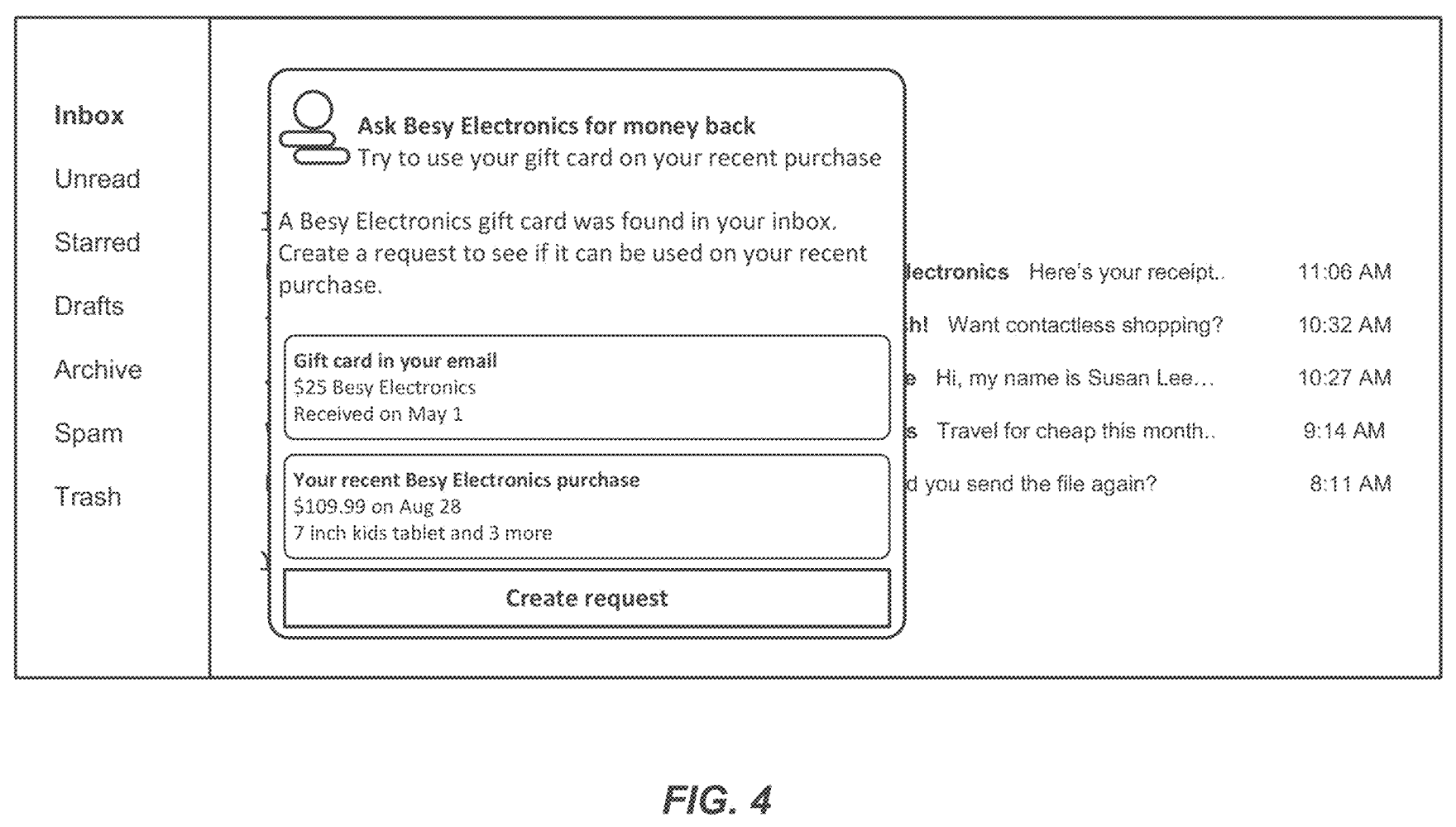

Inbox

Unread

Starred

Drafts

Archive

Spam

Trash

Ask Besy Electronics for money back

Try to use your gift card on your recent purchase

A Besy Electronics gift card was found in your inbox.
Create a request to see if it can be used on your recent purchase.

Gift card in your email
$25 Besy Electronics
Received on May 1

Your recent Besy Electronics purchase
$109.99 on Aug 28
7 inch kids tablet and 3 more Create request lectronics   Here's your receipt..    11:06 AM h!   Want contactless shopping?    10:32 AM e   Hi, my name is Susan Lee...    10:27 AM s   Travel for cheap this month..    9:14 AM d you send the file again?    8:11 AM

*FIG. 4*

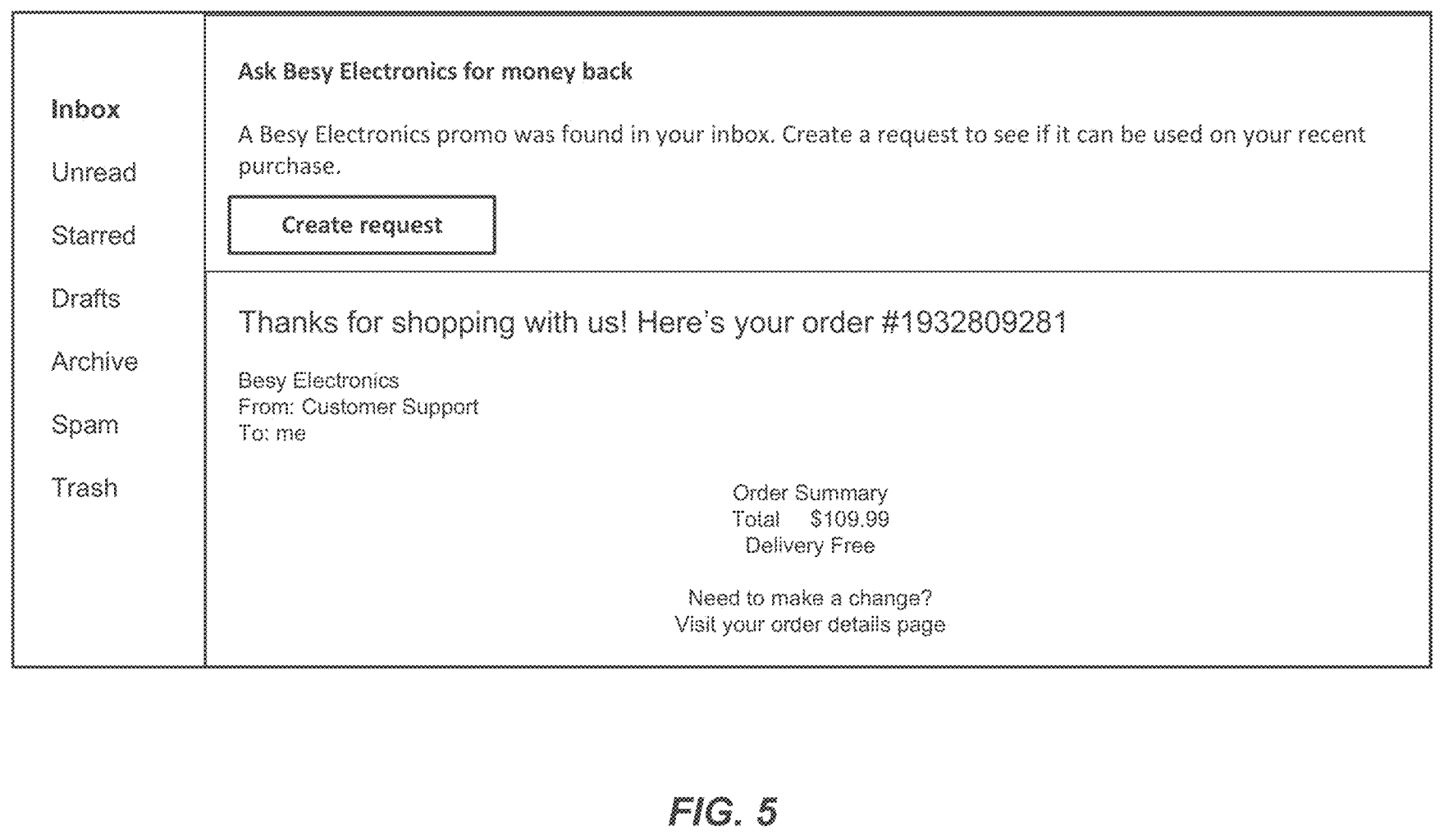

Inbox

Unread

Starred

Drafts

Archive

Spam

Trash

Ask Besy Electronics for money back

A Besy Electronics promo was found in your inbox. Create a request to see if it can be used on your recent purchase.

Create request

Thanks for shopping with us! Here's your order #193280928!

Besy Electronics
From: Customer Support
To: me

Order Summary
Total   $109.99
Delivery Free

Need to make a change?
Visit your order details page

*FIG. 5*

9:41

Ask Besy Electronics for money back
Try to use your gift card on your recent purchase A Besy Electronics gift card was found in your inbox. Create a request to see if it can be used on your recent purchase.

Gift card in your email
$25 Besy Electronics
Received on May 1

Your recent Besy Electronics purchase
$109.99 on Aug 28
7 inch kids tablet and 3 more

Create request

Thanks for shopping with us! Here's your order #1932809281

Besy Electronics
From: Customer Support
To: me

Order Summary
Total    $109.99
Delivery Free

Need to make a change?
Visit your order details page

Delete    Archive    Move     Reply    More

*FIG. 6*

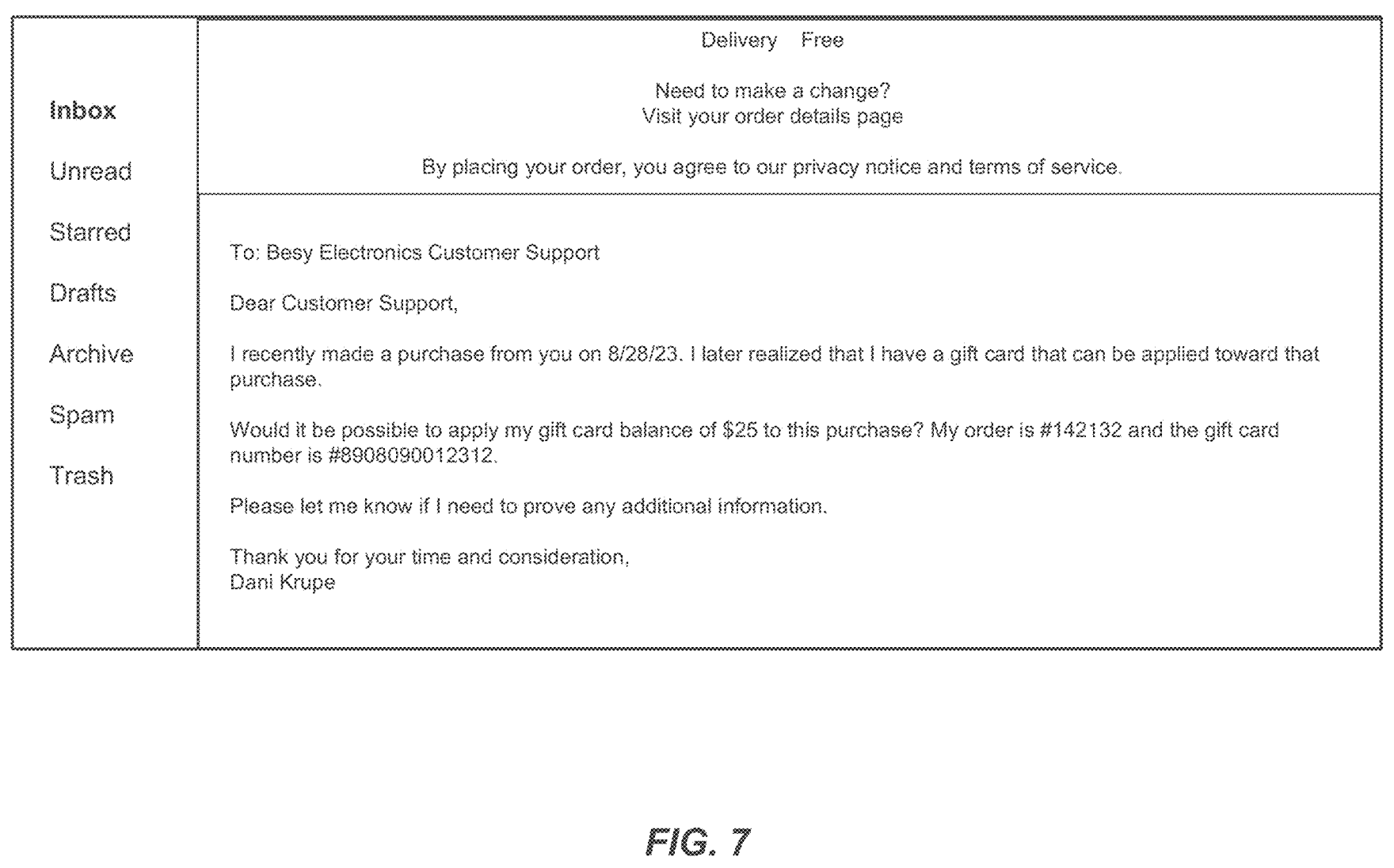

Inbox

Unread

Starred

Drafts

Archive

Spam

Trash

Delivery  Free

Need to make a change?
Visit your order details page

By placing your order, you agree to our privacy notice and terms of service.

To: Besy Electronics Customer Support

Dear Customer Support,

I recently made a purchase from you on 8/28/23. I later realized that I have a gift card that can be applied toward that purchase.

Would it be possible to apply my gift card balance of $25 to this purchase? My order is #142132 and the gift card number is #8908090012312.

Please let me know if I need to prove any additional information.

Thank you for your time and consideration,
Dani Krupe

FIG. 7

SYSTEMS AND METHODS FOR LLM-ASSISTED EMAIL AUTOMATION

CROSS REFERENCE TO RELATED APPLICATION

This application claims the benefit of U.S. Provisional Application No. 63/578,929 filed Aug. 25, 2023, the disclosure of which is incorporated, in its entirety, by this reference.

BACKGROUND

In today's modern online environment, users tend to forget about stored value in their inbox, and often make purchases without applying credits, gift cards, vouchers, e-certificates, rewards or coupons that they could have used during check out (e.g., either online or in person). This can lead to disappointment and frustration on the user's part when they later realize that they had an applicable credit, especially if the credit has since expired. Unfortunately, vendors often do not remind users of applicable credits during the purchase process and a user may complete a purchase transaction without applying the applicable credit.

BRIEF DESCRIPTION OF THE DRAWINGS

FIG. 2 is a flow diagram illustrating a method for LLM-assisted email automation according to some of the example embodiments.

FIG. 3 is an illustration of LLM-assisted email automation according to some of the example embodiments.

FIG. 4 is an illustration of LLM-assisted email automation according to some of the example embodiments.

FIG. 5 is an illustration of LLM-assisted email automation according to some of the example embodiments.

FIG. 6 is an illustration of LLM-assisted email automation according to some of the example embodiments.

FIG. 7 is an illustration of LLM-assisted email automation according to some of the example embodiments.

DETAILED DESCRIPTION

Figure 1:
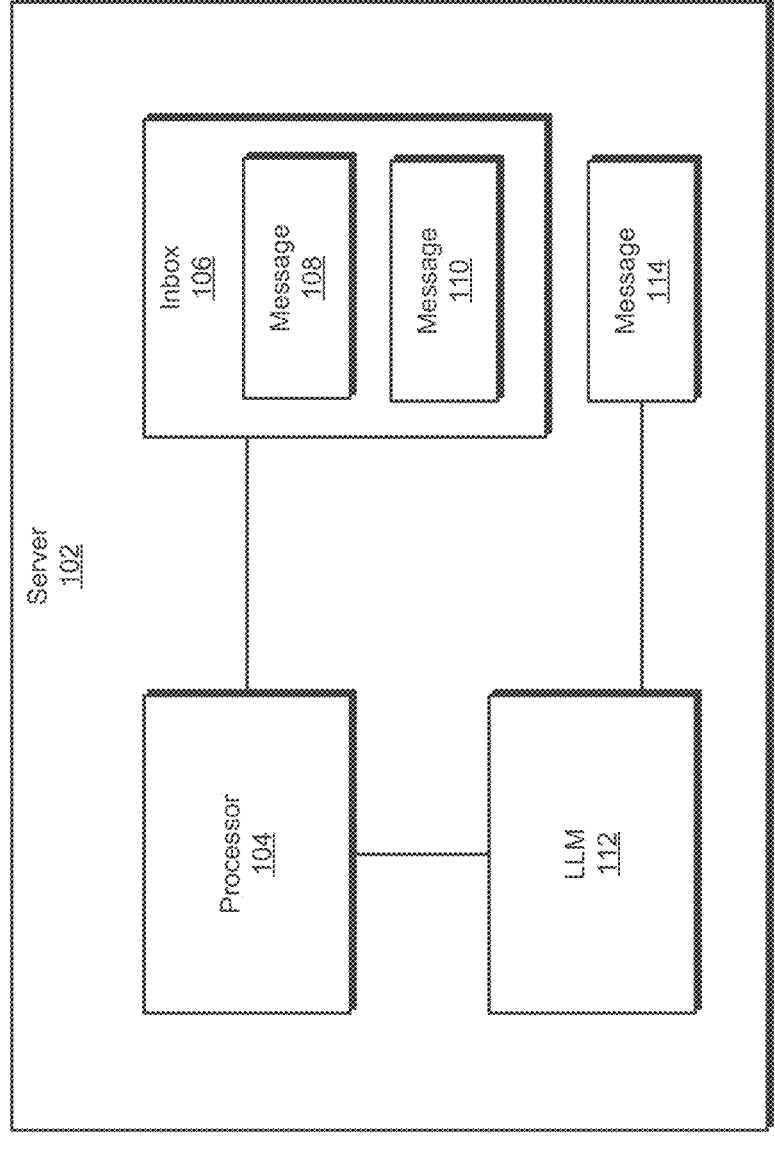
FIG. 1 is a block diagram illustrating a system for large language model (LLM)-assisted email automation according to some of the example embodiments.

In some instances, vendors may retroactively credit coupons or discounts towards an already purchased item if contacted in time. However, users are unlikely to remember the forgotten voucher in time, and even if they do, finding the information and composing a message to customer service for the vendor can be tedious and time-consuming. Accordingly, the instant disclosure includes systems and methods for email automation to compose messages to customer service asking if a credit can be retroactively applied to a purchase.

Various machine learning (ML) and artificial intelligence (AI) models are capable of generating text. One example of such a model is a large language model (LLM). An LLM is a statistical model that predicts the next word in a sequence, given the previous words (often referred to as a "prompt"). LLMs are trained on massive datasets of text, and can be used for a variety of tasks, such as text generation, translation, and question answering. LLMs are typically composed of a neural network with many parameters (typically billions of weights or more). The neural network is trained on a large dataset of text and learns to predict the next word in a sequence, given the previous words. While LLMs are used primarily in the following description, the embodiments described herein can apply equally to other types of text generation models including, but not limited to, long short-term memory (LSTM) models, recurrent neural networks (RNNs), encoder-decoder models, transformer-based models, specialized convolutional neural networks (CNNs) and the like.

The example embodiments herein describe methods, computer-readable media, devices, and systems that, upon identifying a purchase confirmation email, search for gift cards, discount codes, and other types of credits that could have been applied to the purchase, and then prompt an LLM to draft an email to customer service asking for these credits to be applied retroactively to the purchase. In some examples, the systems described herein may display a top of message (TOM) and/or top of inbox (TOI) notification card to the user about the missed discount or credit. As discussed herein, the TOM and TOI can be configured and displayed as interactive interface object (IO) that enables and/or triggers the disclosed LLM functionality discussed herein. Accordingly, TOM and TOI IOs present novel capabilities from within an inbox's display, which can effectuate automated interactions with third party merchants via LLM based interactions streamlined from the inbox.

In some non-limiting embodiments, the disclosed techniques can enable modifications, updates and/or automated controls to be presented within an inbox of a user. For example, when a purchase receipt email is detected as being communicated to a user's inbox (e.g., pre-delivery), the disclosed framework can mine the user's inbox for electronic information related to mechanisms for reducing the purchase price (or overall cost) of the item purchased, as identified from the purchase receipt message. Upon identifying, for example, a coupon code or e-gift card, for example, the disclosed framework can present a TOI IO within the interface of the inbox. This, as provided below, can provide controls and/or functionality for LLM-based messaging and/or interactions with the merchant from which the item was purchased. In some embodiments, upon the purchase receipt message being opened by the user, a TOM IO can be presented, which as provided below, additionally can enable LLM-based interactions with the merchant.

In some implementations, the techniques described herein relate to a method including: (i) identifying, by a processor, an electronic message addressed to an inbox of a user that comprises a confirmation of a transaction involving a platform, (ii) searching, by the processor, for an additional electronic message addressed to the inbox indicating an alteration applicable to the transaction, (iii) causing display, by the processor, of a prompt informing the user of the alteration applicable to the transaction, (iv) composing, by an LLM executed by the processor, a potential electronic message to an operator of the platform requesting the alteration be retroactively applied to the transaction, and (v) in response to receiving user input regarding the potential electronic message, sending, by the processor, a subsequent electronic message to the operator of the platform requesting the alteration be retroactively applied to the transaction.

In some implementations, the techniques described herein relate to a method, wherein composing, by the LLM, the potential electronic message comprises providing the electronic message and the additional electronic message to the LLM as input.

In some implementations, the techniques described herein relate to a method, wherein searching for the additional electronic message addressed to the inbox indicating the alteration applicable to the transaction comprises analyzing, by the LLM executed by the processor, previous electronic messages in the inbox.

In some implementations, the techniques described herein relate to a method, wherein identifying the electronic message comprises determining that the platform is a type of platform that supports retroactive claims.

In some implementations, the techniques described herein relate to a method, further comprising modifying, by the processor, the inbox to display an IO, the IO being an interactive notification that enables the composition via the LLM.

In some implementations, the techniques described herein relate to a method, wherein the IO is displayed at a top of the inbox.

In some implementations, the techniques described herein relate to a method, wherein the IO is displayed within the electronic message upon opening of the electronic message.

In some implementations, the techniques described herein relate to a method, wherein the transaction comprises a purchase.

In some implementations, the techniques described herein relate to a method, wherein the alteration comprises a reduction to a total price of the purchase.

In some implementations, the techniques described herein relate to a method, wherein composing the potential electronic message to the operator of the platform comprises retrieving contact information for the operator of the platform from a database.

In some implementations, the techniques described herein relate to a method, wherein composing the potential electronic message to the operator of the platform comprises identifying contact information for the operator of the platform by parsing public information hosted by the platform.

In some implementations, the techniques described herein relate to a non-transitory computer-readable storage medium for tangibly storing computer program instructions capable of being executed by a computer processor, the computer program instructions defining steps of: (i) identifying, by a processor, an electronic message addressed to an inbox of a user that comprises a confirmation of a transaction involving a platform, (ii) searching, by the processor, for an additional electronic message addressed to the inbox indicating an alteration applicable to the transaction, (iii) causing display, by the processor, of a prompt informing the user of the alteration applicable to the transaction, (iv) composing, by an LLM executed by the processor, a potential electronic message to an operator of the platform requesting the alteration be retroactively applied to the transaction, and (v) in response to receiving user input regarding the potential electronic message, sending, by the processor, a subsequent electronic message to the operator of the platform requesting the alteration be retroactively applied to the transaction.

In some implementations, the techniques described herein relate to a non-transitory computer-readable storage medium, wherein composing, by the LLM, the potential electronic message comprises providing the electronic message and the additional electronic message to the LLM as input.

In some implementations, the techniques described herein relate to a non-transitory computer-readable storage medium, wherein searching for the additional electronic message addressed to the inbox indicating the alteration applicable to the transaction comprises analyzing, by the LLM executed by the processor, previous electronic messages in the inbox.

In some implementations, the techniques described herein relate to a non-transitory computer-readable storage medium, wherein identifying the electronic message comprises determining that the platform is a type of platform that supports retroactive claims.

In some implementations, the techniques described herein relate to a non-transitory computer-readable storage medium, further comprising modifying, by the processor, the inbox to display an IO, the IO being an interactive notification that enables the composition via the LLM.

In some implementations, the techniques described herein relate to a non-transitory computer-readable storage medium, wherein the IO is displayed at a top of the inbox.

In some implementations, the techniques described herein relate to a non-transitory computer-readable storage medium, wherein the IO is displayed within the electronic message upon opening of the electronic message.

In some implementations, the techniques described herein relate to a non-transitory computer-readable storage medium, wherein the transaction comprises a purchase.

In some implementations, the techniques described herein relate to a device including: a processor; and a storage medium for tangibly storing thereon logic for execution by the processor, the logic including instructions for: (i) identifying, by the processor, an electronic message addressed to an inbox of a user that comprises a confirmation of a transaction involving a platform, (ii) searching, by the processor, for an additional electronic message addressed to the inbox indicating an alteration applicable to the transaction, (iii) causing display, by the processor, of a prompt informing the user of the alteration applicable to the transaction, (iv) composing, by an LLM executed by the processor, a potential electronic message to an operator of the platform requesting the alteration be retroactively applied to the transaction, and (v) in response to receiving user input regarding the potential electronic message, sending, by the processor, a subsequent electronic message to the operator of the platform requesting the alteration be retroactively applied to the transaction.

FIG. 1 is a block diagram illustrating a system for LLM-assisted email automation according to some of the example embodiments.

The illustrated system includes a server 102. Server 102 may host a processor 104 that identifies a message 108 addressed to an inbox 106 of a user that comprises a confirmation of a transaction involving a platform and for a message 110 indicating an alteration applicable to the transaction. If such a message 110 is found, processor 104 may cause display of a prompt informing the user of the alteration applicable to the transaction. In some examples, an LLM 112 may compose a potential message 114 to an operator of the platform requesting the alteration be retroactively applied to the transaction. In response to receiving user input regarding message 114, processor 104 may send a subsequent electronic message (e.g., message 114, an edited version of message 114, or an entirely new message). Although illustrated here on server 102, any or all of the systems described herein may be hosted by one or more servers and/or cloud-based processing resources. Additionally, or alternatively, the systems described herein may be hosted on a client device (e.g., a personal computing device such as a laptop or smartphone). Further details of these components are described herein and in the following flow diagrams.

In the various implementations, server 102, processor 104, and/or LLM 112 can be implemented using various types of computing devices such as laptop/desktop devices, mobile devices, server computing devices, etc. Specific details of the components of such computer devices are provided in the description of FIG. 8 which are not repeated herein. In general, these devices can include a processor and a storage medium for tangibly storing thereon logic for execution by the processor. In some implementations, the logic can be stored on a non-transitory computer readable storage medium for tangibly storing computer program instructions. In some implementations, these instructions can implement some of all of the method described in FIG. 2.

In some implementations, inbox 106 can comprise any type or form of user-associated storage for electronic messages including an email inbox, text message inbox, instant message inbox, and so forth. In one implementation, inbox 106 may include a user's current email inbox. Additionally, or alternatively, inbox 106 may include messages addressed to and/or received by a user such as archived messages, messages in the spam folder, messages sorted into subfolders, etc.

FIG. 2 is a flow diagram illustrating a method for LLM-assisted email automation according to some of the example embodiments.

In step 202, the method can include identifying, by a processor, an electronic message addressed to a user that comprises a confirmation of a transaction involving a platform.

In some examples, the electronic message may be an email. Additionally or alternatively, the electronic message may include any type of message including a text message, instant message, short message system message, etc. In some examples, the confirmation of the purchase may include a receipt for the purchase. In one implementation, the systems described herein may identify the electronic message when it is received at a server but before it is delivered to the user (e.g., via a digital inbox on a client device operated by the user).

According to some embodiments, step 202 can involve the processor analyzing each incoming message to determine whether the message is the type of message discussed above. Should the message not be related to a purchased item (e.g., a purchase receipt message, for example), the message can be ignored and processed for delivery in the user's inbox. In some embodiments, upon analyzing the message, should a monetary reduction already be applied (e.g., a discount code, coupon, gift card), the processing may halt, as further discounts may be prohibited.

In some implementations, the processor may query a database of vendors that accept retroactive credit requests in order to determine of the vendor associated with the message is in the database. In one example, if the vendor associated with the message is listed in the database as not accepting retroactive credit requests, the processing may halt, as further discounts may be prohibited. In some implementations, the systems described herein may only compose messages to vendors listed as accepting retroactive credit requests while in other implementations, the systems described herein may compose messages to any vendor not explicitly listed as not accepting retroactive credit requests (e.g., the systems described herein may compose messages to vendors not listed in the database).

In step 204, the method can include searching, by the processor, for an additional electronic message addressed to the inbox indicating an alteration applicable to the transaction. For example, the systems described herein may search previously received emails for coupons, gift cards, etc., from the relevant vendor. Additionally, or alternatively, the systems described herein may search the Internet for publicly accessible coupon codes, etc. Moreover, local and/or remotely located network repositories associated with the user can be identified and searched (e.g., cloud storage, local drives, and the like).

In some embodiments, step 204 can involve steps to compile the query for which a search can be performed. Accordingly, in some embodiments, step 204 can involve analyzing the identified message from step 202, and determining, extracting or otherwise identifying information related to a purchase, which include, but is not limited to, a merchant identifier (ID), user ID, purchase amount, type or ID of item purchased, time, date, location, type of purchase (online or in person), payment method, and the like, or some combination thereof. Thus, such information can be compiled into a query, which can be used for searching a specific location to identify a corresponding monetary reduction mechanism. For example, if the purchased item is from merchant X, then the system herein can compile a search query for non-expired gift card information within messages of the user's inbox that are redeemable at merchant X.

In some embodiments, the LLM may parse messages to identify coupon codes, discount codes, etc. For example, the systems described herein may provide the LLM with a prompt and a message to parse.

Example Prompt:

Given a promotional email text delimited by < > containing information about single or multiple coupons, output a JSON using the following keys for each coupon delimited by triple backticks:

'''promoCode, description, validThrough, duration, requirements'''

Give careful attention to the definition of the JSON keys delimited by triple dashes:

promoCode: The promotional code needed to obtain the offer at checkout. The code is a continuous set of letters and/or numbers. Email content displays it under these common keywords: \"code\", \"promotional code\", \"coupon code\".

description: A description of the coupon.

validThrough: The validity/expiry/end/last date explicitly specified in the text. Strictly output it in \'YYYY-MM-DDTHH:mm:ss\' format. The time HH:mm:ss should be in 24-hour clock format. Email content displays it under these common keywords: "ends on", "expires on", "valid till". If current year (YYYY) is not specified, use 2023 as the current year. Include the time zone information (as UTC offset) if specified in the mail, otherwise assume the time to be in local time. If validity time is not given, strictly assume 23:59:59. Strictly output \"validThrough\" as \"N/A\" if the validity/expiry date is not explicitly specified in the text.

duration: Duration of the validity/expiry of the offer that may be specified relative to the date the message was received. It would appear in the text as \"Offer expires in/valid till \'X\' hour/s or day/s or week/s or month/s or year/s\", where \'X\' is a number that may be expressed in words. Strictly extract \'X\' along with the time unit in the field if the phrase appears in the text.

requirements: Extract all requirements mentioned in the text needed to apply that coupon/offer/promoCode, in a list.

You are strictly ordered to not generate a fake \"pro-moCode\". Extract the \"promoCode\" if given in the text, else use \"N/A\".

If there are multiple coupons present, output a maximum of three coupons present in the text. Do not mix up the coupon details.

If the validity time is in 12-hour format (\'VHH:mm\' am or pm), convert it into 24-hour format and output it in the "validThrough" field.

Steps to convert 12-hour to 24-hour format are given below:

1) If the keywords \"am\" or \"pm\" follows the time, it is in 12-hour format. Otherwise, it is in 24-hour format. If it\'s in 24 hour format, extract the time as it is.

2) If the time is specified in \"am\" (anti meridiem), the time would remain the same in 24-hour clock format. So, extract as it is without the \"am\" keyword.

3) If the time is specified in \"pm\" (post meridiem), add 12 hours to the specified hour. For example, 6:56 pm in 12 hour format is equivalent to (6:56+12:00)=18:56 in 24-hour clock format.

If ss (seconds) is not specified assume 59.

Following are UTC offsets for common time zones in United States:

1. \"EDT\" or \"ET\" or \"New York time\":\"UTC-4:00\"

2. \"CDT\" or \"Chicago time\":\"UTC-5:00\"

3. \"CST\" or \"CT\" or \"Mexico time\":\"UTC-6:00\"

4. \"PDT\" or \"PT\" or \"Los Angeles time\":\"UTC-7:00\"

Use the offset information when determining the \"validThrough\" date. Strictly assume local time if no time zone is specified in the email.

Do not guess the \"duration\" key. Only look for the field in the text if the "validThrough" date is not explicitly specified. Strictly output \"duration\" as \"N/A\" if duration is not mentioned in the text.

Do not guess the \"validThrough\" key. Strictly output \"validThrough\" as \"N/A\" if the validity/expiry date is not explicitly specified in the text.

You're strictly not to guess any key, extract information if given in the text, else use \"N/A\" if you don\'t know the key value.

Do not repeat the coupons in the JSON if they occur multiple times in the text.

Now, output a syntactically correct JSON in the given format:

```
{
    \"coupons\": [
        {...},
        {...},
        ....
    ]
```

In one example, the systems described herein may provide an LLM with the above prompt or a prompt similar to the above and a message and may receive JSON output. Example Output:

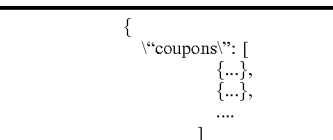

```
{
    "coupons": [
        "promoCode": "INSIDER15",
```

-continued

```
        "description": "15% off",
        "validThrough": "2017-11-15T23:59:59-07:00",
        "duration": "N/A",
        "requirements": [
            "Insider member",
            "any merchandise purchase"
        ]
        }
    ]
}
```

In some examples, the systems described herein may analyze messages with an LLM to determine whether the message contains an applicable credit and, if so, what type of credit. In some implementations, the systems described herein may provide an LLM with a prompt and one or more messages to classify.

Example Classification Prompt:

Classify the email text delimited by < > into 'Order', 'Coupon', 'Gift Card', 'Other' categories.

Give careful attention to the definition of each category delimited by triple backticks that would help you classify:

'Coupon': Text must contain promotional code(s). If you \*find\* promo code(s) in the text, then classify the text as a 'Coupon'. Promotional code is a continuous set of letter and/or numbers needed to obtain the offer at checkout.

'Order': Text contains an order summary, confirmation of a transaction (a receipt), billing information about a product purchase by the customer.

'Gift Card': Text includes information about a gift card number/serial number/reference ID/and a monetary value indicating balance of the gift card.

'Other': Text talks about price drops, sales, discounts and does not include a promotional code. Text doesn't belong to 'Coupon' or 'Order' or 'Gift Card'. Classify the text as "Other" if it requires the user to take actions to receive a coupon or a gift card, for instance, "Sign Up for the Chance to Score a $250 eGift Card" or "Register to receive a $50 Coupon" or "Get a $2 Gift Card for a 3-minute survey".

Note that if you don't know what class the text belongs to strictly output 'Other' as the default category.

Give your answer as a single word indicating the category (amongst the ones listed above) the text belongs to.

In step 206, the method can include causing display, by the processor, of a prompt informing the user of the alteration applicable to the transaction. For example, the systems described herein may transmit the prompt to a client device for display on the client device. In some examples, the prompt may be a TOI and/or TOM notification card (e.g., IO, as discussed supra).

Accordingly, upon identifying a monetary reduction (via step 204), the disclosed system can execute an LLM, for which the query information and information associated with the identified monetary reduction can be input therein.

In step 208, the method can include composing, by the LLM executed by the processor, a potential (or draft) message to the operator of the platform requesting the alteration be retroactively applied to the transaction.

In some implementations, the systems described herein may include a prompt engineering module that creates a prompt for the LLM. Additionally, or alternatively, the systems described herein may store a set of prompts to provide to the LLM (e.g., a prompt for gift cards, a different prompt for discount codes, etc.). In one implementation, the systems described herein may only generate a potential message after receiving confirmation from a user of intent to send a message. Alternatively, the systems described herein may pre-generate the message before receiving input from the user.

In some implementations, the systems described herein may retrieve contact information for the vendor (e.g. a customer service email address) from a database. Additionally, or alternatively, the systems described herein may scrape the vendor's website and/or the Internet for customer service contact information.

In step 210, the method can include, in response to receiving user input regarding the potential electronic message, sending, by the processor, a subsequent message to the operator of the platform requesting the alteration be retroactively applied to the transaction.

In some examples, the method may send the same message composed by the LLM. Alternatively, the method may send a revised version of the message after edits by a user. In some examples, a user may directly edit the text of the message. Alternatively, the user may suggest edits via an LLM chatbot, such as, "make the tone of the message friendlier" and the LLM may output a revised message.

FIG. 3 is an illustration of LLM-assisted email automation according to some of the example embodiments. As illustrated in FIG. 3, in some examples, the systems described herein may display a TOI notification about a missed gift card or other credit. Thus, as depicted in FIG. 3, the TOI notification can be interactive (e.g., it can be expanded as depicted in FIG. 4), and can provide information related to the monetary reduction, mechanisms for redeeming the reduction and/or other types of information related to reasoning for the reductions availability. Accordingly, the TOI notification, whether collapsed or expanded, can be caused to be displayed via modification of the inbox so that the display and provided functionality via interaction with the notification can be enabled without degrading the user's inbox experience.

FIG. 4 is an illustration of LLM-assisted email automation according to some of the example embodiments. As illustrated in FIG. 4, in some examples, a TOI notification may expand after being interacted with (e.g., clicked, tapped) by a user, displaying details about the purchase and/or the missed credit.

FIG. 5 is an illustration of LLM-assisted email automation according to some of the example embodiments. As illustrated in FIG. 5, in some examples, the systems described herein may display a TOM notification about a missed gift card or other credit. This TOM notification can be interactive and can provide information related to the monetary reduction, mechanisms for redeeming the reduction and/or other types of information related to reasoning for the reductions availability. Accordingly, the TOM notification, whether collapsed or expanded, can be caused to be displayed via modification of the message so that the display and provided functionality via interaction with the notification can be enabled without degrading the user's message viewing experience.

FIG. 6 is an illustration of LLM-assisted email automation according to some of the example embodiments. As illustrated in FIG. 6, in some examples, the systems described herein may display an expanded TOM notification (e.g., in response to a user interacting with a non-expanded version as illustrated in FIG. 5).

FIG. 7 is an illustration of LLM-assisted email automation according to some of the example embodiments. As illustrated in FIG. 7, in some examples, the systems described herein may populate an email composition interface with a message generated by an LLM and may enable the user to send and/or edit that message.

In some implementations, the systems described herein may trigger on a receipt received by the user that qualifies, based on the user journey steps outlined below. In one implementation, the systems described herein may use an LLM to craft a polite request to the merchant's customer support email to apply stored value after the purchase. The systems described herein can match a receipt in the user's inbox to any items in the user's wallet on a linked mail system from the same merchant that could be eligible for redemption.

In one implementation, the systems described herein may monitor all connected inboxes for receipts, batched every 24 hours. For every new receipt from a vendor, the systems described herein may evaluate if there are any items for the same vendor in the wallet and/or shopping application that could be retroactively applied. Examples of items may include, without limitation, gift cards, credits, vouchers, e-certificates, rewards, and/or coupons with promo codes. In some implementations, the systems described herein may check to determine whether the item is not expired (e.g., if expiry date is available) and/or not redeemed (e.g., based on a "mark as redeemed" state that can be set by the user and/or by the system).

If there are multiple eligible items for an eligible receipt, the systems described herein may suggest the top singe item (across categories) with the highest value, show multiple items, pick by latest received date, and/or prioritize by item type (e.g., gift cards over coupons).

In one implementation, the systems described herein may evaluate if the receipt already has a form of stored value applied before suggesting a retroactive discount or credit application.

In the batched version of the implementation, the systems described herein may compile all receipts that are eligible for claim attempts from the past 24 hours and then notify the user via TOM card (and if feasible TOI/push notification) about the opportunity for them to attempt to claim their stored value retroactively for their recent purchase(s).

If/when the user engages with TOM/TOI/notification to initiate the claim attempt, (e.g., by opening the merchant email) with the conversational assistant window, the systems described herein may display a dialogue such as, "You have a $25 gift card for this retailer. It may still be possible to apply this to your purchase. Do you want me to draft an email request? YES/NO." The user can dismiss/end the claim attempt. If user confirms, the systems described herein may draft an email (e.g., via an LLM) to the brand's support address. In one implementation, the "to address" may be provided via a static database of the top retailers (e.g., ranked by email traffic volume).

In some embodiments, the drafted email may include the receipt details such as order number, order date, customer information like full name, and so forth. The user may tweak the email and click send or discard it. The TOI card is automatically removed (client-side) after the request is successfully sent.

In some examples, the systems described herein may notify the user via a TOI card (and/or notification) about replies to claim attempts made. If a positive resolution was received, tapping notification/TOI opens a merchant email. If a negative or more information resolution was received, TOI/notification opens merchant email with an LLM conversational window that includes a dialogue such as, "would you like to help me draft a response?" Upon review of the follow-up draft, the user can choose to modify or send the reply, or dismiss/end the claim attempt. In one implementation, the systems described herein may display a prompt (notification/TOI) the user that the bank transaction has been processed.

In some implementations, the systems described herein may monitor attempts and resolutions to continuously improve the AI model. For example, the systems described herein may refine the list of brands where the likelihood of a positive resolution is higher based on past attempts across users and/or iterate on the drafts created based on prior attempts and user edits.

In some implementations, the systems described herein may carry out the process of extracting coupon and gift card details from emails for the retroactive-wallet claim use case in the following steps: (i) mail data preprocessing, (ii) truncating input text, (iii) classification prompt, (iv) POST request to LLM, (v) extraction prompt, and/or (vi) handling model response.

To facilitate mail extractions, the systems described herein may use an instruction-tuned LLM that is suitable for a variety of tasks such as classification, entity extraction, etc. To perform mail data preprocessing, the systems described herein may use, by way of non-limiting example, a Python library, "BeautifulSoup", to obtain a clean text version from the underlying raw HTML mail content. In brief, all textual content is extracted from the emails by parsing the raw HTML structure. In the case of gift card extractions-all textual content except URLs is extracted.

The extracted text is truncated to the first 'N' characters, where 'N' is a number that can vary depending on the prompt length. Precisely, the systems described herein may make sure that the length of the input text is equal 8192 characters. The primary reason for truncating the input text is to avoid violating the maximum token limit of the model. Secondly, truncating the input text helps reduce computation costs and improves model throughput. The truncated text is then passed as input to the classification prompt.

In the one implementation, the systems described herein may support three entity extractions—orders, coupons, and gift cards. The purpose of a classification prompt is to facilitate the categorization of mail content into four categories—"Order", "Coupon", "Gift card" and "Others". The "Others" category may accommodate all emails containing vouchers, discounts, etc. that are not in the first three categories. The systems described herein may devise a classification prompt to instruct the model to analyze the text and strictly output a single label.

The classification prompt is concatenated with the truncated text and is passed to the model through an API call. The systems described herein may use an SDK to send the POST request and get model predictions. Note that the systems described herein may adjust the model parameters to ensure zero randomness (deterministic output) in the model response.

Next, the systems described herein may devise "Coupon" and "Gift Card" extractions prompt to extract attributes relevant to the use case, as described above in connection with step 204 in FIG. 2. Based on the output of the classification prompt, the corresponding extraction prompt is triggered. For "Order" extractions, the systems described herein do not develop a prompt but rather reuse our existing system extractions to avoid computing redundant information.

In one implementation, for coupons, the systems described herein may extract promotional code, description, terms and conditions, and/or validity date. In some examples, the date may include time (e.g., on a 24-hour clock) and time zone information, if specified. Else, the time is assumed to be the end of day and the time zone is assumed to be the user's local time zone. When relative dates are present (e.g. "Coupon expires in 10 days"), the duration is post-processed by a module to obtain the expiry date. For gift cards, the systems described herein may extract gift card number, monetary value, and/or PIN.

The prompts for both extractions instruct the model to produce an output in the JSON format containing the above-listed attributes as keys. The model is instructed to strictly output "N/A" if any of the fields are not present in the text. In one implementation, the coupon extractions prompt may support multiple coupon extractions whereas the gift card extractions prompt may support a single gift card extraction per sample. In the case of multiple gift cards per sample, the model extract details corresponding to the first gift card in the sample. For multiple coupon extractions, the prompt instructs the model to not jumble the coupon details. Next, the corresponding extraction prompt is concatenated with the truncated text and is passed on to the model.

The systems described herein may employ several measures to ensure the model response is properly handled in the following cases: (i) no response from the model, (ii) delay in model response, (iii) invalid JSON string, and/or (iv) maximum input token limit error. For example, the systems described herein may be designed with various types of graceful error handling.

In some implementations, the systems described herein may use an API may process various types of data, such as providing data to the LLM and/or handling LLM output. For example, the API may reformat and/or add data to the LLM output. In one example, the API may receive JSON output from the LLM describing gift card information in an email and may retrieve a customer service email address associated with the vendor who issued the gift card.

Example API Output:

```
{
    "result": {
    "cards": [
        {
            "source": "LLM",
            "type": "GN_CLAIM_HINT",
            "sub Type": "CPN",
            "data": [list of cpn cards with promoCode],
            "vertical": "COMMERCE_UTIL",
            "ttl": 1691021823044,
            "meta":
            "jcds": "MAILBOX",
                "csemail": "guestservices@example.com"
            },
            "i13nMeta": "v=COMMERCE_UTIL"
        },
    ...
]}
```

In one example, the systems described herein may then use the data output by the API as input data for the LLM to compose an email. Additionally, or alternatively, the systems described herein may use the formatted data output by the API to update the user interface for the composed message, for example by adding in the customer service email address.

Figure 8:
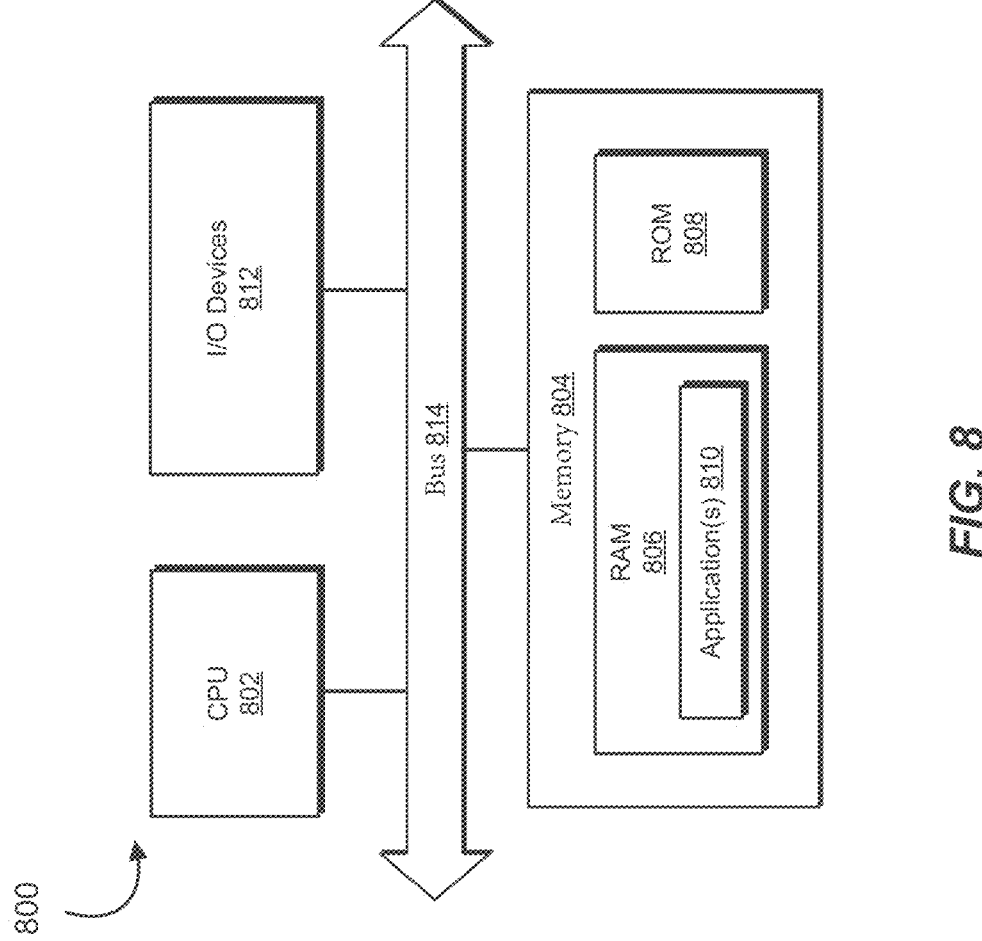
FIG. 8 is a block diagram of a computing device according to some embodiments of the disclosure.

FIG. 8 is a block diagram of a computing device according to some embodiments of the disclosure.

As illustrated, the device 800 includes a processor or central processing unit (CPU) such as CPU 802 in communication with a memory 804 via a bus 814. The device also includes one or more input/output (I/O) or peripheral devices 812. Examples of peripheral devices include, but are not limited to, network interfaces, audio interfaces, display devices, keypads, mice, keyboard, touch screens, illuminators, haptic interfaces, global positioning system (GPS) receivers, cameras, or other optical, thermal, or electromagnetic sensors.

In some embodiments, the CPU 802 may comprise a general-purpose CPU. The CPU 802 may comprise a single-core or multiple-core CPU. The CPU 802 may comprise a system-on-a-chip (SoC) or a similar embedded system. In some embodiments, a graphics processing unit (GPU) may be used in place of, or in combination with, a CPU 802. Memory 804 may comprise a memory system including a dynamic random-access memory (DRAM), static random-access memory (SRAM), Flash (e.g., NAND Flash), or combinations thereof. In one embodiment, the bus 814 may comprise a Peripheral Component Interconnect Express (PCIe) bus. In some embodiments, the bus 814 may comprise multiple busses instead of a single bus.

Memory 804 illustrates an example of a non-transitory computer storage media for the storage of information such as computer-readable instructions, data structures, program modules, or other data. Memory 804 can store a basic input/output system (BIOS) in read-only memory (ROM), such as ROM 808 for controlling the low-level operation of the device. The memory can also store an operating system in random-access memory (RAM) for controlling the operation of the device.

Applications 810 may include computer-executable instructions which, when executed by the device, perform any of the methods (or portions of the methods) described previously in the description of the preceding figures. In some embodiments, the software or programs implementing the method embodiments can be read from a hard disk drive (not illustrated) and temporarily stored in RAM 806 by CPU 802. CPU 802 may then read the software or data from RAM 806, process them, and store them in RAM 806 again.

The device may optionally communicate with a base station (not shown) or directly with another computing device. One or more network interfaces in peripheral devices 812 are sometimes referred to as a transceiver, transceiving device, or network interface card (NIC).

An audio interface in peripheral devices 812 produces and receives audio signals such as the sound of a human voice. For example, an audio interface may be coupled to a speaker and microphone (not shown) to enable telecommunication with others or generate an audio acknowledgment for some action. Displays in peripheral devices 812 may comprise liquid crystal display (LCD), gas plasma, light-emitting diode (LED), or any other type of display device used with a computing device. A display may also include a touch-sensitive screen arranged to receive input from an object such as a stylus or a digit from a human hand.

A keypad in peripheral devices 812 may comprise any input device arranged to receive input from a user. An illuminator in peripheral devices 812 may provide a status indication or provide light. The device can also comprise an input/output interface in peripheral devices 812 for communication with external devices, using communication technologies, such as USB, infrared, Bluetooth®, or the like. A haptic interface in peripheral devices 812 provides tactile feedback to a user of the client device.

A GPS receiver in peripheral devices 812 can determine the physical coordinates of the device on the surface of the Earth, which typically outputs a location as latitude and longitude values. A GPS receiver can also employ other geo-positioning mechanisms, including, but not limited to, triangulation, assisted GPS (AGPS), E-OTD, CI, SAI, ETA, BSS, or the like, to further determine the physical location of the device on the surface of the Earth. In one embodiment, however, the device may communicate through other components, providing other information that may be employed to determine the physical location of the device, including, for example, a media access control (MAC) address, Internet Protocol (IP) address, or the like.

The device may include more or fewer components than those shown in FIG. 8, depending on the deployment or usage of the device. For example, a server computing device, such as a rack-mounted server, may not include audio interfaces, displays, keypads, illuminators, haptic interfaces, Global Positioning System (GPS) receivers, or cameras/sensors. Some devices may include additional components not shown, such as graphics processing unit (GPU) devices, cryptographic co-processors, artificial intelligence (AI) accelerators, or other peripheral devices.

The subject matter disclosed above may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The preceding detailed description is, therefore, not intended to be taken in a limiting sense.

Throughout the specification and claims, terms may have nuanced meanings suggested or implied in context beyond an explicitly stated meaning. Likewise, the phrase "in an embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and," "or," or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, application-specific integrated circuit (ASIC), or other programmable data processing apparatus, such that the instructions, which execute via the processor of the computer or other programmable data processing apparatus, implement the functions/acts specified in the block diagrams or operational block or blocks. In some alternate implementations, the functions or acts noted in the blocks can occur out of the order noted in the operational illustrations. For example, two blocks shown in succession can in fact be executed substantially concurrently or the blocks can sometimes be executed in the reverse order, depending upon the functionality or acts involved.

We claim:

1. A method comprising:
identifying, by a processor, an electronic message addressed to an inbox of a user that comprises a confirmation of a transaction involving a platform;
determining, by the processor, that the platform is a type of platform that permits retroactive claims;
searching, by the processor, upon performing the determination, for an additional electronic message addressed to the inbox indicating an alteration applicable to the transaction, the alteration corresponding to a reduction in a price paid to the platform to complete the transaction;
modifying, by the processor, the inbox to display an interface object (IO), the IO being an interactive notification that enables the composition via the LLM;
causing display, by the processor, in response to interaction with the displayed IO, of a prompt informing the user of the alteration applicable to the transaction;
composing, by a large language model (LLM) executed by the processor, based on information related to the electronic message and the additional electronic message, a potential electronic message to an operator of the platform, the potential electronic message being a draft message requesting the alteration be retroactively applied to the transaction;
providing, by the processor, the potential electronic message to the user, the providing functionality to the user to modify the draft message;
in response to receiving user input regarding the provided potential electronic message, revising, by the LLM, the potential electronic message in line with the user input; and
sending, by the processor, a subsequent electronic message to the operator of the platform requesting the alteration be retroactively applied to the transaction, the subsequent electronic message being a revised version of the potential electronic message.

2. The method of claim 1, wherein searching for the additional electronic message addressed to the inbox indicating the alteration applicable to the transaction comprises analyzing, by the LLM executed by the processor, previous electronic messages in the inbox.

3. The method of claim 1, wherein the IO is displayed at a top of the inbox.

4. The method of claim 1, wherein the IO is displayed within the electronic message upon opening of the electronic message.

5. The method of claim 1, wherein the transaction comprises a purchase.

6. The method of claim 1, wherein composing the potential electronic message to the operator of the platform comprises retrieving contact information for the operator of the platform from a database.

7. The method of claim 1, wherein composing the potential electronic message to the operator of the platform comprises identifying contact information for the operator of the platform by parsing public information hosted by the platform.

8. A non-transitory computer-readable storage medium for tangibly storing computer program instructions capable of being executed by a processor, the computer program instructions defining steps of:
identifying, by the processor, an electronic message addressed to an inbox of a user that comprises a confirmation of a transaction involving a platform;
determining, by the processor, that the platform is a type of platform that permits retroactive claims;
searching, by the processor, upon performing the determination, for an additional electronic message addressed to the inbox indicating an alteration applicable to the transaction, the alteration corresponding to a reduction in a price paid to the platform to complete the transaction;
modifying, by the processor, the inbox to display an interface object (IO), the IO being an interactive notification that enables the composition via the LLM;
causing display, by the processor, in response to interaction with the displayed IO, of a prompt informing the user of the alteration applicable to the transaction;
composing, by a large language model (LLM) executed by the processor, based on information related to the electronic message and the additional electronic message, a potential electronic message to an operator of the platform, the potential electronic message being a draft message requesting the alteration be retroactively applied to the transaction;
providing, by the processor, the potential electronic message to the user, the providing functionality to the user to modify the draft message;
in response to receiving user input regarding the provided potential electronic message, revising, by the LLM, the potential electronic message in line with the user input; and
sending, by the processor, a subsequent electronic message to the operator of the platform requesting the alteration be retroactively applied to the transaction, the subsequent electronic message being a revised version of the potential electronic message.

9. The non-transitory computer-readable storage medium of claim 8, wherein searching for the additional electronic message addressed to the inbox indicating the alteration applicable to the transaction comprises analyzing, by the LLM executed by the processor, previous electronic messages in the inbox.

10. The non-transitory computer-readable storage medium of claim 8, wherein the IO is displayed at a top of the inbox.

11. The non-transitory computer-readable storage medium of claim 8, wherein the IO is displayed within the electronic message upon opening of the electronic message.

12. The non-transitory computer-readable storage medium of claim 8, wherein the transaction comprises a purchase.

13. A device comprising:

a processor; and a non-transitory computer-readable storage medium for tangibly storing thereon logic for execution by the processor, the logic comprising instructions for:

identifying, by the processor, an electronic message addressed to an inbox of a user that comprises a confirmation of a transaction involving a platform;

determining, by the processor, that the platform is a type of platform that permits retroactive claims;

searching, by the processor, upon performing the determination, for an additional electronic message addressed to the inbox indicating an alteration applicable to the transaction, the alteration corresponding to a reduction in a price paid to the platform to complete the transaction;

modifying, by the processor, the inbox to display an interface object (IO), the IO being an interactive notification that enables the composition via the LLM;

causing display, by the processor, in response to interaction with the displayed IO, of a prompt informing the user of the alteration applicable to the transaction;

composing, by a large language model (LLM) executed by the processor, based on information related to the electronic message and the additional electronic message, a potential electronic message to an operator of the platform, the potential electronic message being a draft message requesting the alteration be retroactively applied to the transaction;

providing, by the processor, the potential electronic message to the user, the providing functionality to the user to modify the draft message;

in response to receiving user input regarding the provided potential electronic message, revising, by the LLM, the potential electronic message in line with the user input; and sending, by the processor, a subsequent electronic message to the operator of the platform requesting the alteration be retroactively applied to the transaction, the subsequent electronic message being a revised version of the potential electronic message.

\* \* \* \* \*